Aug. 29, 1950     A. H. DALL     2,520,879
LUBRICATING SYSTEM
Filed March 10, 1944     5 Sheets-Sheet 3
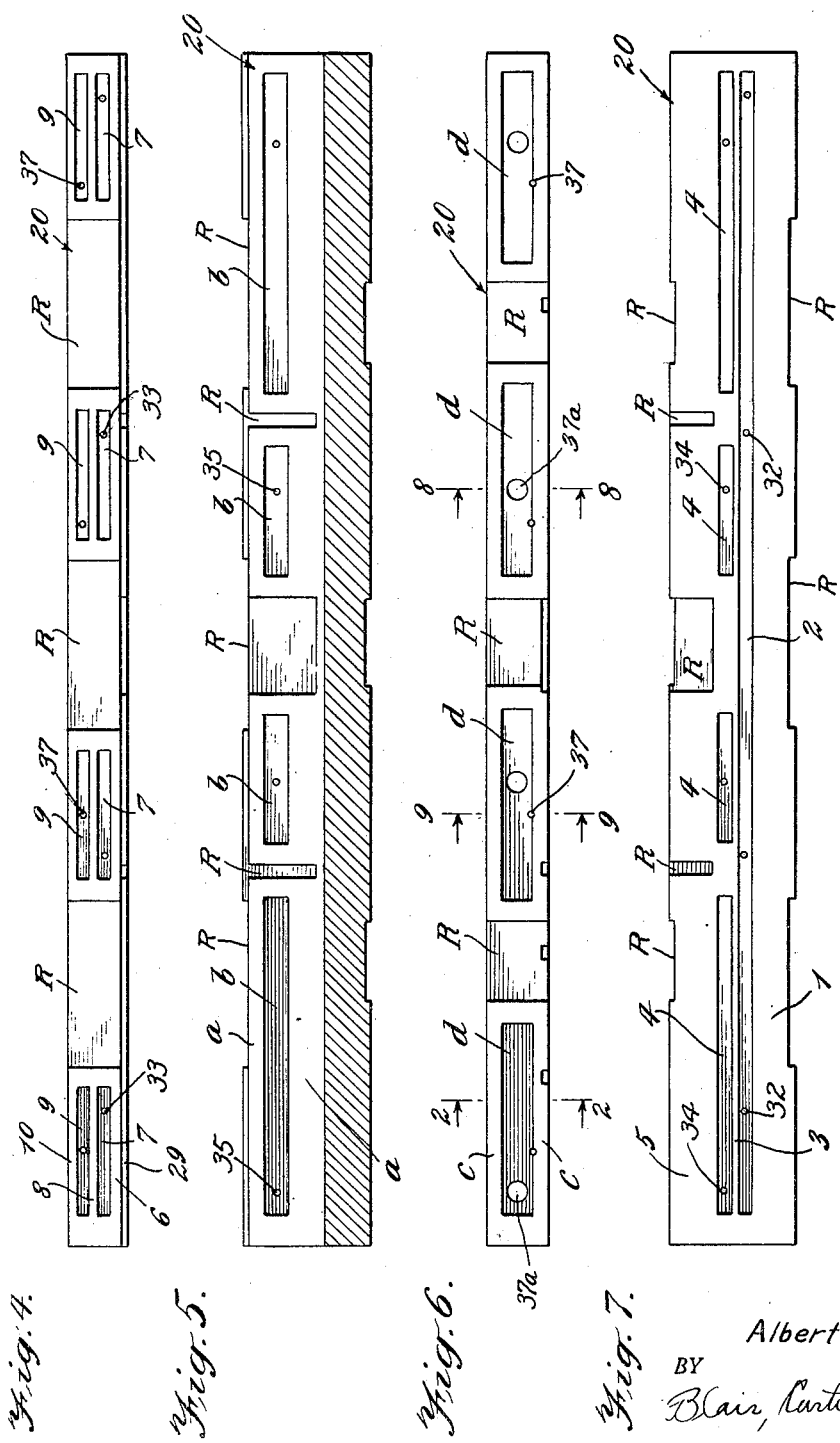
INVENTOR.
Albert H. Dall
BY
Blair, Curtis & Hayward
ATTORNEYS INVENTOR.
Albert H. Dall
BY
Blair, Curtis & Hayward
ATTORNEYS Aug. 29, 1950 — A. H. DALL — 2,520,879
LUBRICATING SYSTEM
Filed March 10, 1944 — 5 Sheets-Sheet 5

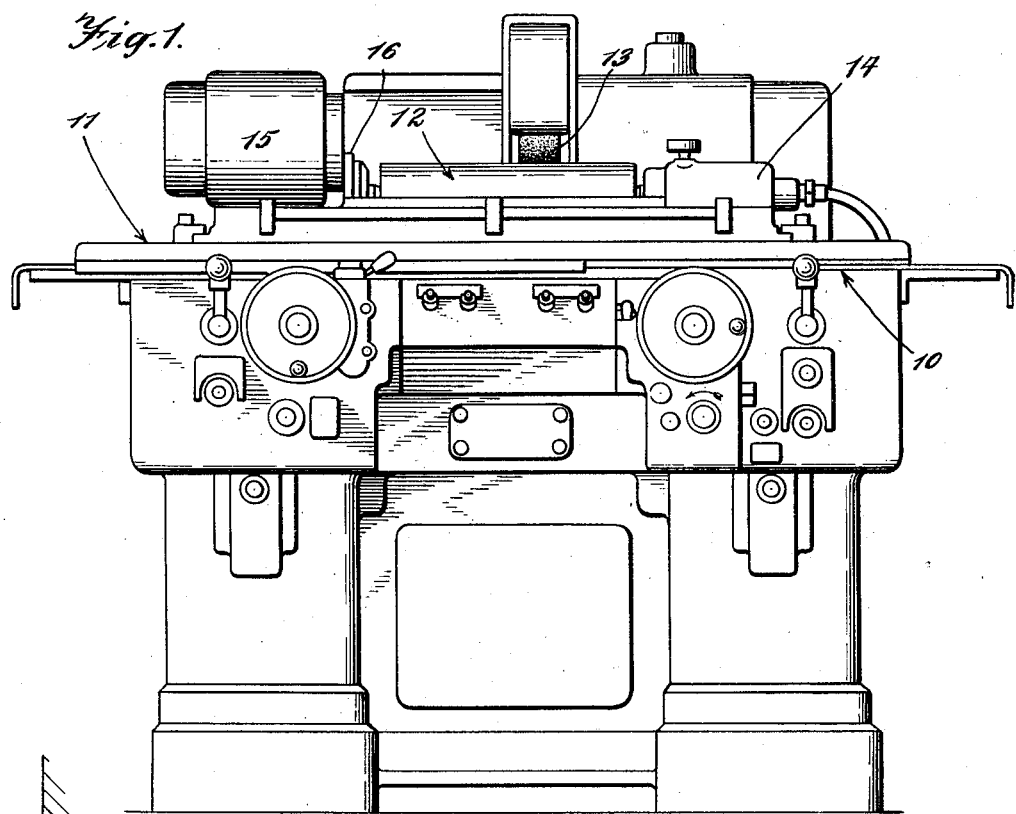
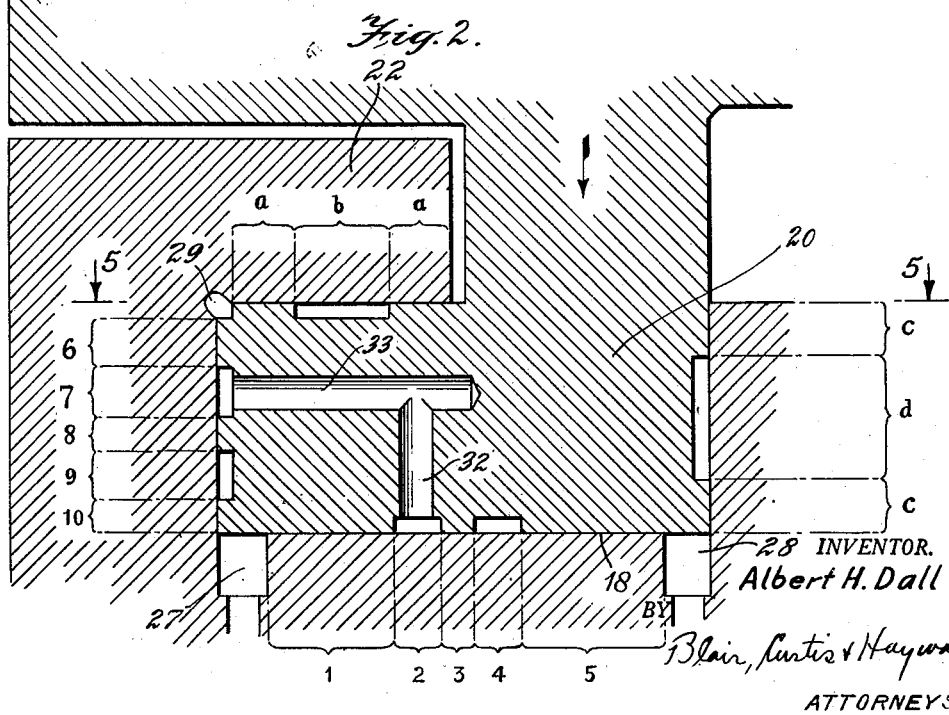

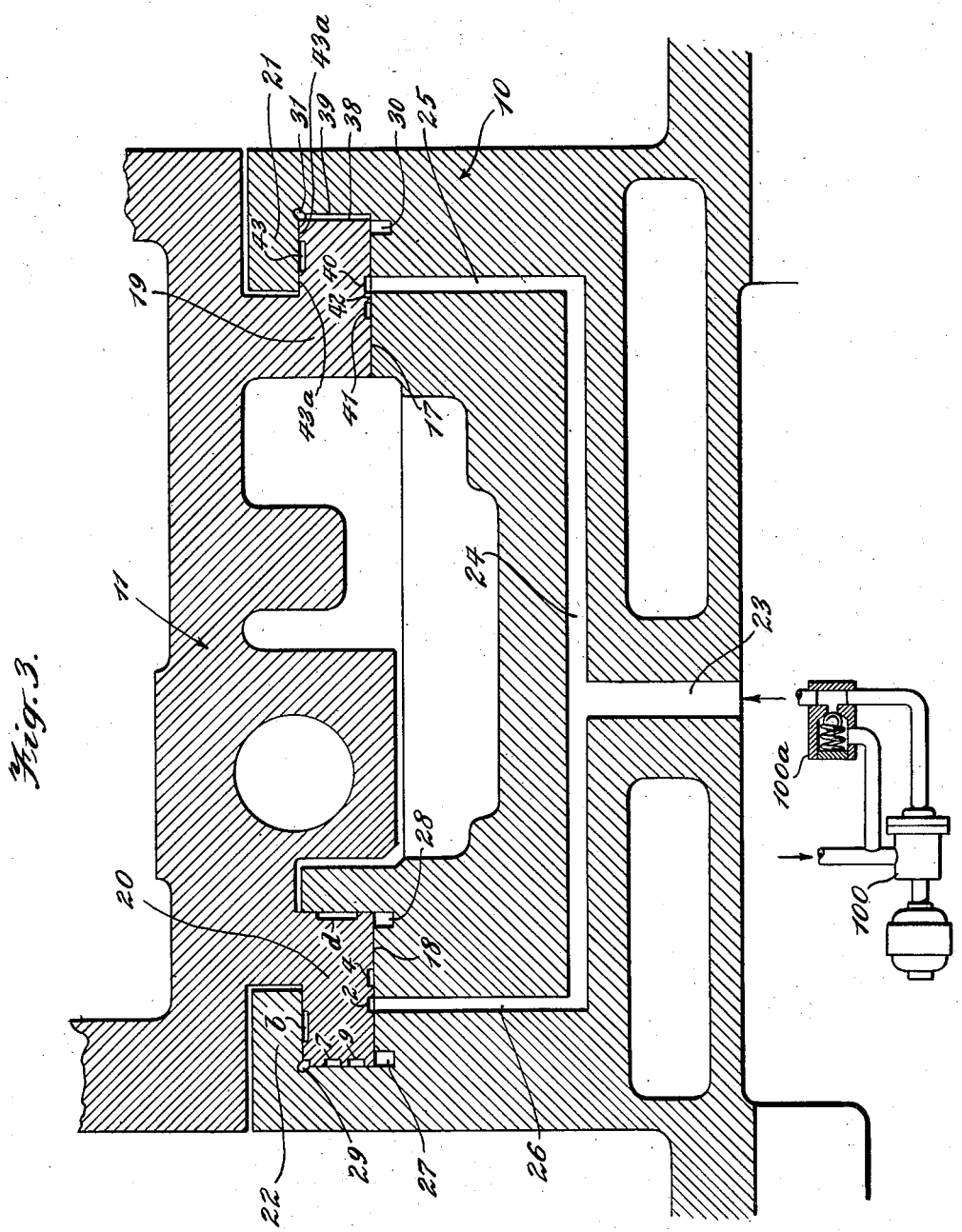

INVENTOR.
Albert H. Dall
BY
Blair, Curtis & Hayward
ATTORNEYS

Patented Aug. 29, 1950

2,520,879

UNITED STATES PATENT OFFICE 2,520,879

LUBRICATING SYSTEM

Albert H. Dall, Cincinnati, Ohio, assignor to The Cincinnati Milling Machine Co., Cincinnati, Ohio, a corporation of Ohio Application March 10, 1944, Serial No. 525,829

29 Claims. (Cl. 184—6)

This invention relates to a lubricating system for slidably related members such as the table and bed surfaces of a machine tool or the like.

One of the objects of this invention is to provide a lubricating system for sliding or relatively movable surfaces which is simple in design and hence susceptible of economical manufacture. Another object is to provide a system of the above character which is free from structural weaknesses and hence is reliable in operation. Another object is to provide a system of the above character wherein bearing surfaces may be maintained wholly in spaced relationship to avoid any metal to metal contact of such surfaces even when a bearing member distorts or bends. Another object is to provide a system of the above character wherein the spacing is maintained as noted above in spite of variation in direction or degree of load applied to the bearing structure. Other objects will be in part obvious and in part pointed out hereinafter.

The invention accordingly consists in the features of construction, combinations of elements, and arrangements of parts, all as will be illustratively described herein, and the scope of the application of which will be indicated in the following claims.

In the accompanying drawings in which is shown several of the various possible embodiments of the above invention:

Figure 1 is a front elevation of a machine tool having the features of the invention incorporated therein;

Figure 2 is an enlarged sectional view taken along the line 2—2 of Figure 6 with certain associated parts not shown in Figure 6 diagrammatically indicated;

Figure 3 is a diagrammatic sectional view taken through the bed and table of the machine shown in Figure 1 to indicate generally the structure involved and the association of various parts;

Figure 4 is a side elevation of a portion of the table fitting in one of the ways of the bed as shown in Figure 3;

Figure 5 is a horizontal section taken on the line 5—5 of Figure 2.

Figure 6 is an elevation of the other side of the portion shown in Figure 4;

Figure 7 is a plan view of the bottom of the portion shown in Figure 4;

Similar reference characters refer to similar parts throughout the several views of the drawings.

Figure 8:
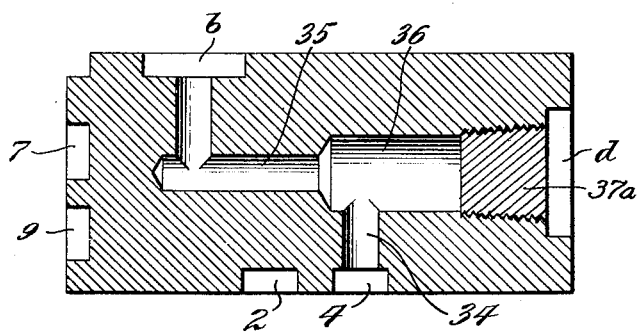
Figure 8 is a vertical section taken along the line 8—8 of Figure 6.

My invention has a variety of applications but is illustratively shown applied to the precision grinding machine illustrated in Figure 1, wherein there is a bed generally indicated at 10 having a reciprocating table generally indicated at 11 slidably mounted thereon. The table supports work 12 in the conventional manner and is designed to reciprocate sideways, as viewed in Figure 1, past the grinding wheel 13. The table 11 also includes a tailstock 14 and a motor 15 for driving the headstock 16. It will be appreciated that the dead weight is unevenly distributed throughout the length of the table 11 so that the forces pressing the table against the bed are of different magnitude at different points throughout its length.

Furthermore, in the operation of a machine such as this grinding machine, the load applied at any point on the bed, for example, by the grinding wheel 13 varies according to the work being done and the relative position of the bed and table. Furthermore, tables such as the table 11 may be very long in comparison to their thickness and thus tend to bend vertically under load variation. Bearing in mind that a grinding machine such as that illustrated is designed for precision work, it will be understood that it is important to maintain a substantially constant vertical relationship between table and bed throughout the table length, i. e., vertical bending of the table should be avoided or reduced to an absolute minimum; it is also necessary to avoid any metal to metal contact which type of wear and tear is ruinous to the machine. Accordingly, lubrication of all bearing surfaces of the table and bed becomes of utmost importance; this is a principal object of the present invention.

It should be understood that a lubricating system such as that to be presently described may also be applied to other sliding machine parts, for example, the wheel head slide of the machine shown in Figure 1, where it is particularly useful because of the importance of accurate adjustments and settings. On the wheel head slide it is sometimes important to hold the slide down on the bed positively as by gibs. Such slides must be moved slowly and accurately to make fine adjustments; often the wheel must advance a fraction of a thousandth of an inch. The static friction encountered when plain bearings are used for such slides has always made this operation troublesome, i. e., to avoid a tendency of the slide to jump ahead as it overcomes static friction. This is done by an initial retraction and subsequent advance to the new desired position. With the presently described lubricating system, the slide is free-floating and hence immediately responsive to the slightest movement of the adjusting devices; static friction is eliminated for all practical purposes. Consequently, this troublesome retraction and advance is eliminated.

In Figure 3, the bed 10 and table 11 are indicated diagrammatically in transverse vertical section (the table moving toward and from the observer). The bed 10 has a pair of spaced longitudinal ways 17 and 18 supporting substantially rectangular portions 19 and 20 of the table. Thus the forces applied to table 11 will be divided by the portions 19 and 20 into vertical forces acting on the horizontal surfaces of the ways 17 and 18 and horizontal forces acting on vertical surfaces.

The bed includes gib portions 21 and 22 (Figure 3) extending toward each other over table portions 19 and 20 to form top way surfaces, smaller in area than the bottom surfaces of the ways. A line 23 is connected to a source of liquid under pressure such as the pump 100 and to a passage 24 formed in the bed 10. A relief valve 100a is connected to pump 100 to provide for overflow to the pump inlet in the event of increase above a certain predetermined pressure. Thus assuming normal operation of the pump a constant pressure is maintained in passage 24 and connected parts. Passage 24 is connected to vertical passages 25 and 26 leading to the bottom surfaces of ways 17 and 18. Thus lubricant under desired pressure may be supplied to the ways to provide lubrication in the manner to be described. As viewed in Figure 3, drainage channels 27 and 28 are provided in the bed adjacent the bottom corners of way 18, a drainage channel 29 is located in the upper left corner thereof, and drainage channels 30 and 31 are provided adjacent the right corners of way 17, as viewed in Figure 3.

Turning now to a more detailed consideration of the table portion 20, as shown in Figures 4, 5, 6, and 7, the four sides are provided with recesses, pockets, land surfaces and relief zones as will now be described. The top of the portion 20 (Figure 5) has formed therein pressure pockets $b$, while the bottom surface (Figure 7) has the pressure recess 2 and the collecting recesses 4; pockets $b$ are of larger area than recesses 4. The left surface of portion 20 (Figure 4) has the pressure recesses 7 and collecting recesses 9; the right surface (Figure 6) has the pressure pockets $d$ formed therein. Relief zones R are provided throughout the four surfaces and these together with the recesses, pockets, and drainage channels define the land areas as will be understood from a consideration of Figure 2. These land areas are as follows:

Land area 1—Between drainage channel 27 and pressure recess 2.
Land areas 3—Between pressure recess 2 and collecting recesses 4.
Land areas 5—Between collecting recesses 4 and drainage channel 28.
Land areas 6—Between drainage channel 29 and pressure recesses 7.
Land areas 8—Between pressure recesses 7 and collecting recesses 9.
Land areas 10—Between collecting recesses 9 and drainage channel 27.
Land areas $a$—Between the pressure pockets $b$ and drainage channel 29 and pressure pockets $b$ and the right-hand edge of gib portion 22.
Land areas $c$—Between pressure pockets $d$ and drainage channel 28 and between pressure pockets $d$ and the top surface of the way.

Figure 9:
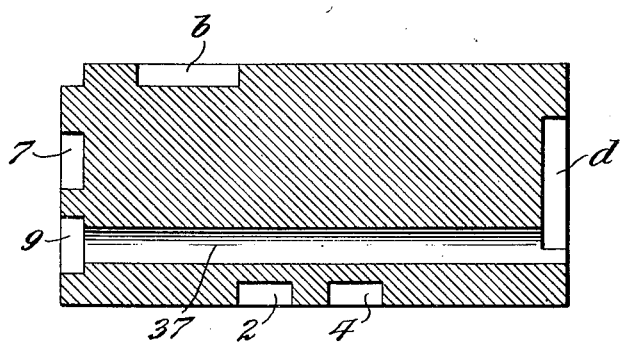
Figure 9 is a vertical section taken along the line 9—9 of Figure 6.

Referring to Figure 2, pressure recess 2 is connected to pressure recesses 7 through table portion 20 by way of passages 32 and 33. As seen in Figure 8, each of collecting recesses 4 is connected to the opposite pressure pocket $b$ by passages 34 and 35 and a chamber 36 closed at its right end by a plug 37a. Turning to Figure 9, each of the collecting recesses 9 is connected to the opposite pressure pocket $d$ by a passage 37. These three connections are longitudinally spaced; hence only one appears in each of Figures 2, 8 and 9 and none appears in Figure 3.

Pump 100 is connected to pressure recess 2 via passages 23, 24, and 26 (Figure 3), and thus its operation puts the interconnected recesses 2 and 7 under pressure. Land surfaces 3, $a$, 8 and $c$ (Figure 2) together with cooperating surfaces of the way 18 form resistances to flow into and from pockets $b$ and $d$. More particularly, lands 3 and 8 determine flow resistance to collecting recesses 4 and 9 and hence inflow to pockets $b$ and $d$ respectively. Lands $a$ and $c$ determine flow resistance from pockets $b$ and $d$, respectively, and, consequently, variation of any of these resistances affects pressure in some pressure pocket. Vertical movement of portion 20 changes the resistances of lands 3 and $a$ to vary pressure in pockets $b$ and recesses 4 while horizontal movement affects lands 8 and $c$ to change the pressure in pockets $d$ and recesses 9. The net effect is the creation of variable resistances controlling pressure of the pressure pockets.

If a liquid under pressure (oil for example) is supplied to the pressure recess 2, the pressure will force fluid out over land 1 to drainage channel 27 and over lands 3 into collecting recesses 4 and thence over lands 5 to drainage channel 28. If the pressure has been calculated properly with respect to the weight of the table in a manner to be described and if the dimensions of lands 3 and $a$ have been similarly calculated, a film of liquid will be maintained throughout the surfaces of lands 1, 3, and 5, which with the liquid in recesses 2 and 4 supports the table free from all bottom surfaces of the way 18. Still assuming proper calculations, there will be a liquid in the collecting recesses 4 under a reduced pressure due to resistances of lands 3 and $a$. The same pressure being in pockets $b$ on the top surface of portion 20, there is a film of oil under pressure on the land surfaces $a$.

Thus assuming proper calculations, the table will be supported on a liquid film. If an additional load is placed on the table in a downward direction (arrow) as viewed in Figure 2, land 3 of portion 20 moves closer to the bottom surface of way 18 opposite the load. This raises the resistance to flow of liquid between the adjacent pressure recess 2 and collecting recess 4 resulting in a reduction in pressure in recess 4 and lands 3 and 5, as well as connected pocket b. This pressure reduction will be accentuated by a corresponding movement of lands a away from gib portion 22 which decreases resistance to outflow from this pocket b. This reduction in pressure in pocket b and consequent reduction in pressure on lands a in a downward direction compensates for the additional load applied to the table in a downward direction and the resulting decrease in pressure in recess 4 and on lands 3 and 5. Hence this new condition immediately results in an exact correcting action to maintain the table 20 free from the bottom surface of the way.

Still referring to Figure 2, the dimensions of lands 8 and c should be determined from the above calculations to allow for an oil film on lands 6, 8, and 10 and a proper pressure value in collecting recesses 9. Under such conditions the pressure in pocket d will correspond to the pressure in recesses 9 and an oil film will be maintained on the lands c.

Accordingly any load applied on the table toward the left, as viewed in Figure 2, will increase the resistance to flow over land 8 and decrease resistance over lands c, thereby reducing the pressure in recesses 9 and pockets d. Since the pressure in pockets d is applied to the table toward the left, as viewed in Figure 2, such reduction results in compensation for the additional load toward the left and the resulting decrease in pressure in recess 9 and on lands 8 and 10 to maintain the table out of engagement with the left surface of way 18.

A similar lubricating arrangement may be arranged for table portion 19 and corresponding way 17 (Figure 3). In this preferred embodiment, as shown in Figure 3, there are no pockets and recesses in the vertical surfaces of the portion 19. Preferably the right surface 38 of the portion 19 is spaced from the right surface 39 of way 17. But the bottom surface of table portion 19 is preferably provided with pressure recess 40 similar to pressure recess 2 and hence aligned with channel 25. Collecting recesses 41 are also provided in the bottom surface of table portion 19 spaced from recesses 40 by land surfaces 42. Each of the recesses 41 is connected to a pressure pocket 43 opposite thereto in the top surface of the table portion by suitable passages (not shown). Lands 42, collecting recesses 41, and pressure pockets 43 are preferably intended to correspond in dimensions and location with corresponding collecting recesses 4, lands 3 and pressure pockets b in table portion 20. Inasmuch as the pressure conditions in the pressure receiving recesses 2 and 40 are identical, the same lubricating action will take place between the top and bottom surfaces of table portion 19 and corresponding surfaces of way 17 in the preferred application of the invention. Of course, land surfaces 43a are proportioned and shaped like land surfaces a (Figure 2) and hence act to affect the pressure in pockets 43 in the manner mentioned above.

As noted above, the liquid at pump pressure flows through the resistance formed by lands 3 and into collecting recesses 4 and pockets b at reduced pressure. It also flows through the resistance formed by lands a from pockets b to drainage channel 29 at zero pressure. Preferably the resistances of lands a are equal to the resistances of lands 3 when the dead weight of the table is the only load and thus the pressure in pockets b will be one-half pump pressure. Accordingly, the relationship of the width to the length of all lands should be substantially the same or $$\frac{Wa \text{ (width of lands } a)}{2La \text{ (length of lands } a)} = \frac{W3 \text{ (width of land 3)}}{L3 \text{ (length of land 3)}}$$

For purposes of greater clarity, we shall assume certain dimensions and weights for the table and calculate complete dimensions and pressure conditions therefor. Of course, it is to be understood that these dimensions and weights, in fact all calculations are merely illustrative and may vary within wide limits to suit particular applications of the invention.

In the present calculations we assume that the pressure in recesses 4 is one-half of the pump pressure in recesses 2 with no load other than the dead weight of the table because the flow resistances of lands 3 and a are then equal as noted above.

*Pressure calculation for vertical loads*

[P = pump pressure]

| | Assumed Width (inches) | | Assumed Length (inches) |
|---|---|---|---|
| Land 1 | ½ × | P/2 (mean of full pressure in 2 and zero pressure in 27) | × 18¾ = 4.60P |
| Recess 2 | ⅜ × | P | × 17¾ = 6.33P |
| Land 3 | ⅛ × | ¾P (mean of full pressure in 2 and half pressure in 4) | × 14 = 1.31P |
| Land area between ends of pockets 4 | ¾ × | P/2 | × 3¾ = .70P |
| Receiving recesses 4 | ³⁄₁₆ × | P/2 (assumed pressure) | × 14 = 1.31P |
| Land 5 | ⁹⁄₁₆ × | P/4 (mean of ½ pressure at 4 and zero pressure at 28) | × 14 = 1.97P |

13.32P

Assume total width of lands a and pressure pockets b = ⅞".
Then b + 2a = ⅞ and b = ⅞ − 2a.
Assume a = ¼, b = ⅜.
Now solving for lands a and pressure pocket b:

| | | | |
|---|---|---|---|
| Lands a | ¼ × P/4 (mean of ½ pressure in b to zero pressure at edges of 22) | × 14 × 2 | = 1.750P |
| Pressure pocket b | ⅜ × P/2 (assumed pressure) | × 14 | = 2.625P |

4.375P 13.22P = 260 (table weight) + 4.375P
8.845P = 260
P = 29.4 pounds per square inch In the usual application such as this grinding machine, the downward force which includes the weight of the table as its principal factor is far greater than any additional forces which may be applied to the table during operation. Accordingly, it is necessary to calculate the necessary pressure of liquid to be applied to the various pressure recesses 2 to take care of this principal load. Having determined that in the assumed application of the invention the liquid pressure must be 29.4 pounds per square inch, it then is possible to deduce the resulting pressures and necessary dimensions in the vertical surfaces of the way, understanding, of course, that the resistances of lands 8 and c are designed to provide one-half pump pressure in collecting recesses 9 and pressure pockets d with no load other than the table.

*Calculation of pressure on left side of way*

|  | Assumed Width | Pressure | Assumed Length |
|---|---|---|---|
| Land 6 | 3/16 × P/2 (mean of full pressure in 7 and zero pressure in 29) | × 8 = | .75 P |
| Pressure recess 7 | 3/16 × P | × 8 = | 1.50 P |
| Land 8 | 1/8 × 3/4 P (mean of full pressure in 7 and half pressure in 9) | × 8 = | .75 P |
| Collecting recess 9 | 3/16 × P/2 (assumed pressure) | × 8 = | .75 P |
| Land 10 | 1/8 × P/4 (mean of half pressure in 9 and zero pressure in 27) | × 8 = | .25 P |
|  |  |  | 4.00 P |

Solving for dimensions of $c$ and $d$ on right-hand side of way:

$$P/2 \times d \times 12 = 6Pd$$
$$P/4 \times 2c \times 12 = 6Pc$$
$$2c + d = 7/8'', \; d = 7/8'' - 2c$$
$$6Pd + 6Pc = 4P$$
$$6(7/8 - 2c) + 6c = 4$$
$$5\tfrac{1}{4} - 12c + 6c = 4$$
$$-6c = -1\tfrac{1}{4}$$

$c = .208$ inch
$d = 7/8 - 2 \times .208$
$d = .459$ inch

As noted above, the principal load in an application such as that illustrated is the weight of all parts of the table. Accordingly, with the weight of the table as a known factor, the areas, resistances and pressures can be so arranged that the clearances between the top and bottom surfaces of the table portions and corresponding way surfaces are equally spaced under principal load. With such equal clearances the flow volumes at the top and bottom of table portions 19 and 20 will be equal resulting in a uniform flow throughout the system. Thus the necessary pump pressure and liquid volume may be reduced to a minimum and an optimum condition can be maintained. Such calculations are possible because the area of the bed portions 21 and 22 (Figure 3) opposing the table portions 19 and 20 is much smaller than the bottom supporting area of the ways 17 and 18. Such a system as that illustrated herein can be termed "an unsymmetrical system" in contrast with two opposed pressure areas of equal dimensions with equal total pressure values. The unsymmetrical system is admirably suited for a condition, such as illustrated herein, where the principal load is in the form of a dead weight and the object is to offset this load by maintenance of adequate clearance between relatively moving bearing surfaces and continuance of such condition upon the application of additional unknown loads of smaller magnitude but in various directions.

Figure 10:
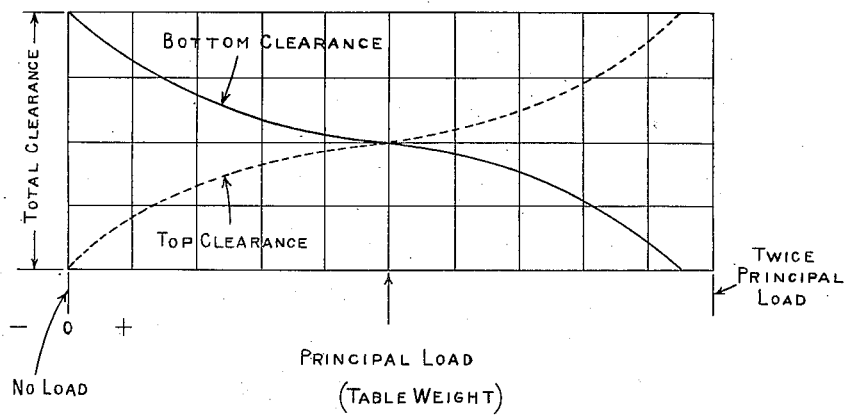
Figure 10 is a graphic indication of certain aspects of the operation of the lubricating system.

In Figure 10, a graph illustrates the important features of the unsymmetrical system as applied to the machine illustrated in Figure 1 to support the dead weight of the table 11. This graph illustrates a set of assumed conditions such as those set forth above, and it will be seen that an equal clearance is maintained between the respective horizontal bearing surfaces of the table and bed with no load other than the weight of the table. Furthermore, the additional loads which may be applied to the table are relatively small and hence, as indicated in Figure 10, any variation in the clearance on the top or bottom side of the ways will be correspondingly small. The result is the elimination of any hazard of a metal to metal contact of bearing surfaces so long as the required pressure values are maintained.

Figure 11:
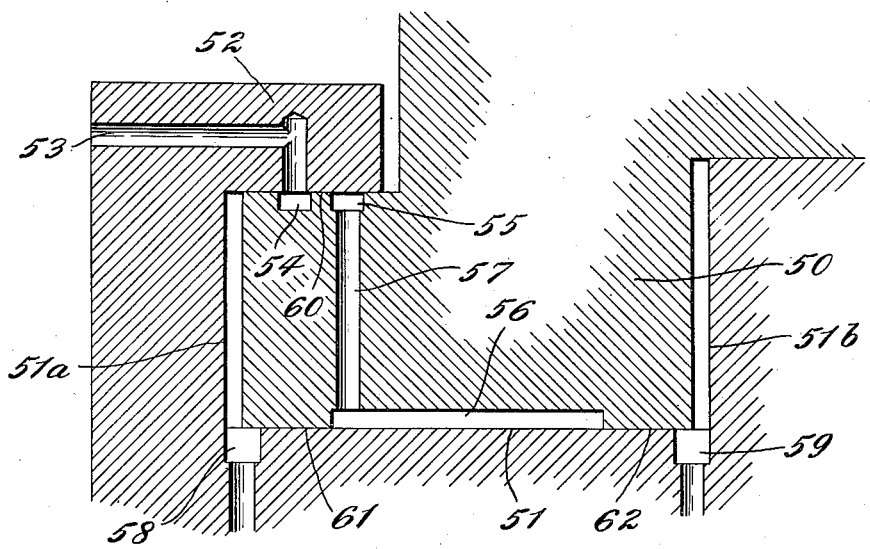
Figure 11 is a diagrammatic sectional view similar to Figure 2 but showing another embodiment of the invention.

In the embodiment shown in Figure 11, the table portion 50 is similar in shape to table portion 20 (Figure 3) and is mounted in a way 51 similar to the way 18. However, the vertical surfaces 51a and 51b of the way 51 are spaced from portion 50. A gib portion 52 of the bed extends over the top surface of portion 50 to hold the table against upward displacement.

Liquid under pressure from a pump (not shown) is supplied to a passage 53 leading to a pressure recess 54 formed in the top surface of portion 50. Collecting recesses 55 are also provided in the top surface of portion 50 spaced from the recess 54 and connected to pressure pockets 56 in the bottom surface of portion 50 by passages diagrammatically indicated at 57. Drainage channels 58 and 59 are formed adjacent the bottom corners of the way 51. Thus the land surfaces 60 between recess 54 and recesses 55 and the land surfaces 61 and 62 between the pressure pockets 56 and drainage channels 58 and 59 provide with adjacent way surfaces variable flow resistances into and from pressure pocket 56. In the manner described above, these resistances and pressure values may be determined in accordance with the weight of the table being supported, as well as the degree and direction of any forces which may be applied thereto during operation. Under normal circumstances portion 50 will be floatably supported with equal clearance adjacent its top and bottom surfaces. Upon application of a downward force, flow resistance over lands 60 will be reduced and flow resistance over the lands 61 and 62 will be correspondingly increased to make for an increase in pressure in the pressure pocket 56 with its offsetting effect as described above.

Accordingly, the various objects mentioned above as well as many others have been successfully and practically accomplished.

As many possible embodiments may be made of the mechanical features of the above invention all without departing from the scope of the invention, it is to be understood that all matter hereinbefore set forth or shown in the accompanying drawing is to be interpreted as illustrative and not in a limiting sense.

I claim:

1. In a lubricating system, in combination, a machine bed member including horizontally spaced ways with vertically spaced surfaces, a slide member including portions fitting within said ways between said surfaces, the vertical dimensions of said portions being somewhat less than the corresponding distance between said surfaces to provide clearance therebetween, said slide member having a plurality of connected pairs of depressions, the depressions of each pair being in opposite surfaces of said slide portions, and means for introducing liquid under pressure at points in said clearance space spaced from said depressions and adjacent one surface of said slide portions.

2. In a lubricating system, in combination, a machine bed with a rectangular way, a slide shaped to fit within said way with clearance therebetween, one horizontal and one vertical surface of the slide having pressure pockets, the other surfaces of said slide having collecting recesses opposite said pockets, means connecting each collecting recess to the pressure pocket opposite thereto, and means for introducing liquid under pressure in said clearance at points spaced from said collecting recesses.

3. In a lubricating system, in combination, a machine bed member with a way having vertically spaced bearing surfaces, a slide member with bearing surfaces shaped to fit between said first-mentioned surfaces, one of said members having pressure pockets formed adjacent one of said surfaces, each of said pockets being independently connected with points on the opposite surface of said slide member, and means for introducing liquid under pressure between said members adjacent said last-mentioned surface and spaced from said points.

4. In a lubricating system, in combination, means forming two spaced opposed bearing surface portions of unequal area, a bearing member movably supported between said surface portions, and means for introducing lubricant under pressure at points adjacent each of said surface portions controlled in accordance with the direction or amount of load imposed on said member whereby said member is held equally spaced from said surface portions in spite of said load.

5. In a lubricating system, in combination, means forming two spaced opposed bearing surface portions of unequal area, a bearing member movably fitted within said means between said surface portions, means forming a source of liquid under pressure, means connecting said source with points adjacent each of said surface portions, means forming variable resistances in said connecting means controlled in accordance with the direction or amount of load imposed on said member whereby said member may be maintained equally spaced from said surface portions regardless of the load.

6. In a lubricating system, in combination, a supporting member including a pair of spaced longitudinal bearing surfaces in parallel planes, a member mounted between said surfaces for longitudinal movement with respect thereto, said member being of uneven weight in different portions of its length and being long in comparison with its thickness and thus tending to bend toward said bearing surfaces under variation in load, one of said members having a plurality of longitudinally spaced pressure pockets formed adjacent one of said surfaces, and means for introducing liquid under pressure at a point adjacent the other of said surfaces, said pockets being connected to points adjacent said last-mentioned surface and spaced from said first-mentioned point.

7. In a lubricating system, in combination, a supporting member including a pair of spaced longitudinal bearing surfaces in parallel planes, a member mounted between said surfaces for longitudinal movement with respect thereto, said member being of uneven weight in different portions of its length and being long in comparison with its thickness and thus tending to bend toward said bearing surfaces under variation in load, one of said members having a plurality of longitudinally spaced pressure pockets formed adjacent one of said surfaces, and an equal number of collecting recesses each opposite and connected to one of said pockets and adjacent the other of said surfaces, and means for introducing liquid under pressure to said last-mentioned surface at a point spaced from said recesses.

8. In a lubricating system, in combination, a supporting member with a way including a pair of vertically spaced bearing surfaces and a pair of horizontally spaced bearing surfaces, a member mounted between said surfaces for longitudinal movement with respect thereto, said last-mentioned member being of such size as to provide a clearance between said members and being of uneven weight in different sections of its length, said member also being long in comparison with its thickness and thus tending to bend upon variation in load thereon or change in position on said supporting member, a plurality of longitudinally spaced pressure pockets being formed adjacent one horizontal and one vertical surface, a plurality of pressure recesses opposite each of said pockets and adjacent the other surfaces, each of said recesses being connected to the pressure pocket opposite thereto, and means introducing liquid under pressure at points spaced from said recesses and adjacent said last-mentioned surfaces.

9. In a lubricating system, in combination, a supporting member with a way including a pair of vertically spaced bearing surfaces and a pair of horizontally spaced bearing surfaces, a member mounted between said surfaces for longitudinal movement with respect thereto, said last-mentioned member being of such size as to provide a clearance between said members, said last-mentioned member having a plurality of longitudinally spaced pressure pockets formed in one horizontal and one vertical surface thereof and collecting recesses formed in the opposite surfaces, each of said recesses being opposite and connected to one of said pockets, and means for introducing fluid under pressure at points adjacent said last-mentioned surfaces and spaced from said recesses.

10. In a lubricating system, in combination, a supporting member including a pair of vertically spaced longitudinal bearing surfaces, a member mounted between said surfaces for longitudinal movement with respect thereto and with clearance therebetween, the upper bearing surface having the smallest area, one of said members having a plurality of longitudinally spaced pressure pockets formed adjacent said upper surface and a plurality of collecting recesses opposite and connected to said pockets and adjacent the other bearing surface, and means for introducing fluid under pressure at a point adjacent said last-mentioned surface spaced from said recesses.

11. In a lubricating system, in combination, a supporting member including a pair of vertically spaced longitudinal bearing surfaces, a member mounted between said surfaces for longitudinal movement with respect thereto, said member being of uneven weight in different sections of its length and being long in comparison with its thickness and thus tending to bend vertically under variation of load, the upper bearing surface having the smallest area, one of said members having a plurality of longitudinally spaced pressure pockets formed adjacent said last mentioned surface and a plurality of collecting recesses opposite and connected to said pockets and adjacent the other bearing surface, and means for introducing fluid under pressure at a point adjacent said last-mentioned surface spaced from said recesses, said pressure being sufficient to insure an oil film throughout the area of said last-mentioned surface.

12. In a lubricating system, in combination, a machine tool having a bed including a way with vertically spaced bearing surfaces, a table having a bearing portion fitting within said way with clearance therebetween, said table being long in comparison with its thickness and being of uneven weight and hence tending to bend vertically, said portions including longitudinally spaced pressure pockets adjacent one of said surfaces and collecting recesses each opposite and connected to one of said pockets and adjacent the other of said surfaces, and means for introducing fluid under pressure adjacent said last-mentioned surface and spaced from said recesses.

13. In a lubricating system, in combination, a machine tool having a bed including a way with horizontally spaced bearing surfaces, a table having a bearing portion fitting within said way with clearance therebetween, said table being long in comparison with its thickness and hence tending to bend, said portions including longitudinally spaced pressure pockets adjacent one of said surfaces and collecting recesses each opposite and connected to one of said pockets and adjacent the other of said surfaces, and means for introducing fluid under pressure adjacent said last-mentioned surface and spaced from said recesses.

14. In a lubricating system, in combination, a machine bed member including horizontally spaced ways with vertically spaced surfaces, a slide member including portions fitting within said ways between said surfaces, the vertical dimensions of said portions being somewhat less than the corresponding distances between said surfaces to provide clearance therebetween, said slide member having a plurality of connected pairs of depressions in the opposite surfaces of said slide portions, and means for introducing liquid under pressure at a point in said clearance space spaced from said depressions, and adjacent one surface of said slide portions, said clearance being proportioned to provide flow resistance into and from the depressions in the other surface of said slide portions which will vary upon any vertical movement of the slide member.

15. In a lubricating system, in combination, a machine bed with a rectangular way, a slide shaped to fit within said way with clearance therebetween, one horizontal and one vertical surface of the slide having pressure pockets, the other surfaces of said slide having collecting recesses opposite said pockets, each of said recesses being connected to one of said pockets, and means for introducing liquid under pressure in said clearance at points spaced from said collecting recesses, the clearance being proportioned to provide flow resistance to and from said pressure pockets, whereby relative movement of said bed and slide will vary said resistance.

16. In a lubricating system, in combination, a supporting member including a pair of spaced longitudinal bearing surfaces in parallel planes, a member mounted between said surfaces for longitudinal movement with respect thereto, said member being of uneven weight in different portions of its length and being long in comparison with its thickness and thus tending to bend toward bearing surfaces under variation in load, said members being proportioned to provide clearance therebetween, one of said members having a plurality of longitudinally spaced pressure pockets formed adjacent one of said surfaces, and means for introducing oil under pressure at a point adjacent the other of said surfaces, said pockets being connected to points adjacent said last-mentioned surface and spaced from said first-mentioned point, said clearance being proportioned to provide flow resistance to and from said pockets, whereby relative movement of said members varies said resistance.

17. In a lubricating system, in combination, a supporting member with a way including a pair of vertically spaced bearing surfaces and a pair of horizontally spaced bearing surfaces, a member mounted between said surfaces for longitudinal movement with respect thereto, said last-mentioned member being of such size as to provide a clearance between said members, said last-mentioned member having a plurality of longitudinally spaced pressure pockets formed in one horizontal and one vertical surface thereof, and collecting recesses formed in the opposite surfaces, each of said recesses being opposite and connected to one of said pockets, and means for introducing fluid under pressure at points adjacent said last-mentioned surfaces and spaced from said recesses, the clearance being proportioned to provide flow resistance to and from said pressure pockets, whereby relative movement of said members varies said resistance.

18. In a lubricating system, in combination, a machine bed having a way of rectangular shape in cross section, a slide of rectangular shape in cross section shaped to fit within said way with clearance space between the surfaces of the slide and the walls of said way, one horizontal and one vertical surface of the slide having pressure pockets, the other surfaces of said slide having collecting recesses opposite said pockets, means for introducing liquid under pressure into said clearance space at points spaced from said collecting recesses, and means connecting each collecting recess to the pocket opposite thereto.

19. In a lubricating system, in combination, a machine bed having a way of rectangular shape in cross section, a slide of rectangular shape in cross section shaped to fit within said way with clearance space between the surfaces of the slide and the walls of said way, one horizontal and one vertical surface of the slide having pressure pockets, the other surfaces of said slide having collecting recesses opposite said pockets, pressure recesses positioned in the surfaces of said slide opposite the surfaces having pressure pockets therein, means for introducing liquid under pressure from a source of supply into said pressure recesses, said collecting recesses being spaced from said pressure recesses, the clearance space between said slide and way controlling the flow of liquid from said pressure recesses to said collecting recesses, and means connecting each collecting recess to the pocket opposite thereto.

20. In a lubricating system, in combination, a machine bed member with a way having vertically spaced bearing surfaces, a slide member with bearing surfaces shaped to fit between said first-mentioned surfaces, one of said members having pressure pockets formed opening toward one of said surfaces, each of said pockets being independently connected with a collecting recess on the opposite surface of said slide member, and means for introducing liquid under pressure into said recesses through the clearance space between said members adjacent said last-mentioned surface and spaced from said points.

21. In a lubricating system, in combination, a machine bed member with a way having vertically spaced bearing surfaces, a slide member with bearing surfaces shaped to fit between said first-mentioned surfaces, one of said members having pressure pockets formed opening toward one of said surfaces, each of said pockets being independently connected with a collecting recess on the opposite surface of said slide member, means forming a pressure recess in the same surface as said collecting recesses, means for introducing liquid under pressure into said pressure recess, and means forming collector grooves adjacent the edges of said spaced bearing surfaces.

22. In a lubricating system, in combination, means forming two spaced opposed bearing surface portions, a bearing member movably fitted within said means and including surface portions spaced from said first-mentioned surface portions, means forming a source of liquid under pressure, means including the clearance space between said first and second-mentioned surface portions connecting said source with pressure pockets in the surface portions of said bearing member, said clearance space forming variable resistances in said connecting means controlled in accordance with the direction or amount of load imposed on said member whereby said member may be maintained spaced from said first-mentioned surface portions regardless of the load.

23. In a lubricating system, in combination, a supporting member including a pair of spaced longitudinal bearing surfaces in parallel planes, a member mounted between said surfaces for longitudinal movement with respect thereto, said member being of uneven weight in different portions of its length and being long in comparison with its thickness and thus tending to bend toward said bearing surfaces under variation in load, one of said members having a plurality of longitudinally spaced pressure pockets formed adjacent one of said surfaces, means forming an equal number of collecting recesses each opposite and connected to one of said pockets and adjacent the other of said surfaces, means forming a pressure recess in said last-mentioned surface extending longitudinally of and spaced from said collecting recesses, and means for introducing liquid under pressure to said pressure recess, said liquid flowing through said clearance space between said members to said collecting recesses.

24. In a lubricating system, in combination, a supporting member with a way including a pair of vertically spaced bearing surfaces and a pair of horizontally spaced bearing surfaces, a member mounted between said surfaces for longitudinal movement with respect thereto, said last-mentioned member including surfaces juxtaposed to said first-mentioned surfaces and being of such size as to provide clearance space between the surfaces of said members, said clearance space forming a hydraulic resistance to flow of liquid between said members, one of said members having a plurality of longitudinally spaced pressure pockets formed in one horizontal and one vertical surface thereof, means forming a collecting recess for each pressure pocket on the opposite side of said last-mentioned member, each of said recesses being opposite, connected to one of said pockets, and opening into said clearance space, and means for introducing fluid under pressure at points spaced from said recesses, said fluid flowing through said clearance space to said collecting recesses.

25. In a lubricating system, in combination, a supporting member including a pair of vertically spaced longitudinal bearing surfaces, a member mounted between said surfaces for longitudinal movement with respect thereto, said member being of uneven weight in different sections of its length and being long in comparison with its thickness and thus tending to bend vertically under variation of load, the upper bearing surface having the smallest area, one of said members having a plurality of longitudinally spaced pressure pockets formed adjacent said last-mentioned surface, means forming a plurality of collecting recesses opposite and connected to said pockets and adjacent the other bearing surface, pressure recess means adjacent said last-mentioned surface and spaced from said collecting recesses, and means for introducing lubricating fluid under pressure into said pressure recess means, said pressure being sufficient to insure a film of fluid throughout the area of said last-mentioned surface, said fluid flowing from said pressure recess means through the clearance space between said surfaces to said collecting recesses, said clearance space acting as a hydraulic resistance to flow of lubricant from said pressure recess means to said collecting recesses.

26. In a lubricating system, in combination, a machine tool having a bed including a way with vertically spaced bearing surfaces, a table having a bearing portion fitting between said bearing surfaces with clearance space therebetween, said table being long in comparison with its thickness and being of uneven weight and hence tending to bend vertically, said portion including longitudinally spaced pressure pockets adjacent one of said surfaces and collecting recesses each opposite and connected to one of said pockets and adjacent the other of said surfaces, means forming a pressure recess in the same surface as and spaced from said collecting recesses, said pressure recess extending longitudinally of said collecting recesses, the only connection between said pressure recess and said collecting recesses being through the hydraulic resistance formed by said clearance space, and means for introducing fluid under pressure into said pressure recess.

27. In a lubricating system, in combination, a machine bed member including horizontally spaced ways with vertically spaced surfaces, collecting grooves extending longitudinally of the sides of said surfaces, a slide member including portions fitting within said ways between said surfaces, the vertical dimensions of said portions being slightly less than the corresponding distances between said surfaces to provide clearance therebetween, said slide member having a plurality of connected pairs of pockets and recesses in the opposite surfaces of said slide portions, means forming a pressure recess, and means for introducing liquid under pressure into said pressure recess adjacent one surface of said slide portions, said clearance being proportioned to provide flow resistance from the pressure recess to the first mentioned recesses which will vary upon any vertical movement of the slide member.

28. In a lubricating system, in combination, a supporting member including a pair of spaced longitudinal bearing surfaces in parallel planes, drainage grooves extending longitudinally of the edges of said bearing surfaces, a member mounted between said surfaces for longitudinal movement with respect thereto, said member being of uneven weight in different portions of its length and being long in comparison with its thickness and thus tending to bend toward bearing surfaces under variation in load, said members being proportioned to provide clearance therebetween, said second mentioned members having a plurality of longitudinally spaced pressure pockets opening toward one of said bearing surfaces and a plurality of collecting recesses opening toward the other bearing surface, means forming a pressure recess extending longitudinally of said collecting recesses, means connecting each collecting recess to a pressure pocket and means for introducing oil under pressure into said pressure recess, said clearance being proportioned to provide flow resistance to and from said pockets and recesses, whereby relative movement of said members varies said resistance.

29. In a lubricating system, in combination, a machine bed having a way thereon with vertically spaced parallel flat bearing surfaces, a slide having parallel flat bearing surfaces fitting between said first-mentioned bearing surfaces, means forming pressure pockets in one of the bearing surfaces of said slide, said pockets being longitudinally spaced on said slide with respect to each other and being spaced from the edges of the flat bearing surface in which they are formed, whereby oil flowing from each pocket flows through the clearance space between the opposed bearing surfaces of said slide and way to drainage, said clearance space forming a variable out-resistance to said flow, means forming collecting recesses in the other bearing surface of said slide, each of said pockets being independently connected to a collecting recess positioned directly opposite thereto, means forming a pressure recess in the same surface of said slide as said collecting recesses, means for continuously introducing liquid under pressure into said pressure recess, said liquid flowing from said pressure recess through the clearance space between the bearing surfaces of said slide and said way to each collecting recess, said last-mentioned clearance space forming a variable in-resistance to said last-mentioned flow, and said out-resistance being equal to said in-resistance when the dead weight of the table is the only load.

ALBERT H. DALL.

REFERENCES CITED

The following references are of record in the file of this patent:

UNITED STATES PATENTS

| Number | Name | Date |
|---|---|---|
| 2,031,368 | Hodson | Feb. 18, 1936 |
| 2,140,983 | Carter | Dec. 20, 1938 |
| 2,079,700 | Archea | May 11, 1939 |